United States Patent [19]
Mrozinski et al.

[11] Patent Number: 5,676,899
[45] Date of Patent: Oct. 14, 1997

[54] PROCESS FOR PRODUCING ARTICLES FROM SYNTHETIC RESINS HAVING WOOD APPEARANCE

[76] Inventors: John B. Mrozinski, 4919 Dock St., Onekama, Mich. 49675; John L. Lindeman, 258 Third St., Manistee, Mich. 49660

[21] Appl. No.: 418,373

[22] Filed: Apr. 7, 1995

Related U.S. Application Data

[63] Continuation of Ser. No. 625,144, Dec. 7, 1990, abandoned.
[51] Int. Cl.⁶ .................. B29C 33/40; B29C 70/30
[52] U.S. Cl. .................................. 264/226; 264/227
[58] Field of Search .................. 264/220, 219, 264/226, 227

[56] References Cited

U.S. PATENT DOCUMENTS

| | | | |
|---|---|---|---|
| 3,704,531 | 12/1972 | Seals | 427/264 |
| 3,772,110 | 11/1973 | Brown | 264/227 |
| 3,816,155 | 6/1974 | Iverson et al. | 427/274 |
| 3,839,120 | 10/1974 | Kilian | 264/220 |
| 4,103,056 | 7/1978 | Baratto et al. | 428/142 |
| 4,125,351 | 11/1978 | Alfter et al. | 425/405.1 |
| 5,075,059 | 12/1991 | Green | 264/257 |

*Primary Examiner*—Robert Davis
*Attorney, Agent, or Firm*—Waters & Morse, P.C.

[57] ABSTRACT

Products having a real wood appearance from synthetic resins, are produced by creating a mold from a wood plug having a grain pattern of the type desired; treating the wood to the extent necessary to open the grain pores as desired; creating a mold from an impression from the wood plug; molding products from the mold, applying a pigmented viscous paste to the products and wiping the paste on the products to produce the desired finish color; the paste containing dryers to promote prompt drying; and applying a clear finish coat over the surfaces of the products.

11 Claims, 1 Drawing Sheet

PROCESS FOR PRODUCING ARTICLES FROM SYNTHETIC RESINS HAVING WOOD APPEARANCE

CROSS REFERENCE TO RELATED APPLICATION

This is a continuation of applicant's patent application, Ser. No. 07/625,144, filed Dec. 7, 1990 and now abandoned, entitled PROCESS FOR PRODUCING ARTICLES FROM SYNTHETIC RESINS HAVING WOOD APPEARANCE.

BACKGROUND OF THE INVENTION

A wide range of products that were once made from wood are now being made of synthetic resins of one form or another. Synthetic resins have the ability to be formed in molds in intricate shapes and have the advantage of being resistant to weather and require little maintenance.

While synthetic resins have advantages of durability and formability, they have always lacked the warmth and look and feel of real wood with its beautiful natural grain and deep lustre. Thus, appearance is sacrificed in order to obtain the advantages of synthetic resins.

Prior attempts have been made to provide products with wood-like appearances. For example, wood grain patterns are embossed in steel panels; and wood grain patterns are printed on surfaces or on paper-like materials that are applied as surface layers to synthetic products or to products formed of chip board or the like. On occasion, wood grain surface textures (but not appearance) have been obtained in molded products from impressions taken from wood surfaces. While these products are able to achieve a pattern that reminds the user of wood, the products do not look like wood, and the fact that the products are not wood is readily apparent. The closest to a real wood appearance that has been achieved is the fabrication of a product with a very thin veneer or real wood applied to a synthetic resin or other base. This type of product involves a substantial amount of extra expense and fabrication cost.

An object of the present invention is to provide a process for applying a wood-like finish to a synthetic resin product that is virtually indistinguishable from a genuine wood finish without requiring the application of real wood veneer to the exterior of product.

SUMMARY OF THE INVENTION

In accordance with the present invention, a process for producing synthetic resin products having a real wood appearance comprises the steps of forming a model or plug of the product from real wood having the desired grain pattern; treating the wood to the extent necessary to remove any finish and open the wood grain; producing a mold from the plug from a moldable resin after treating the plug to promote separation of the mold from the plug; molding products with the mold from a moldable synthetic resin after treating the mold to promote product release, the molded products having simulated wood grain pores corresponding to the open grain pores in the wood plug, the products being molded with a surface layer having a base pigment color no darker than the desired wood color; applying a viscous pigmented toner paste of the finish color desired to the surface of the products and wiping the paste on the surface so as to produce the desired color intensity on the surface and in the simulated wood grain pores of the products; the toner paste including dryers to the extent necessary to promote prompt drying; and applying a protective finish over the surface of the product.

In order to achieve a realistic wood grain appearance in the molded product, the wood plug is subjected to a surface treatment prior to mold manufacture in order to open and enhance the wood grain configuration of the wood. To do this, it is preferred that the surface of the wood be brushed with a stiff nylon brush in order to open the pores of the darker grain portion of the wood. Sandblasting can be used on hard, close grained woods, such as cherry or maple, and some chemicals, such as acetone and some paint removers, also open the grain of the wood. The extent to which the grain is opened and deepened depends upon the appearance desired in the finish molded product.

Proper treatment of the wood plug prior to the fabrication of the mold from the plug also is important. With a deep grain structure in the wood, mold materials tend to penetrate and grip the wood, making separation difficult. With the fragile fibers of the wood, separation can destroy the surface of the wood. A prior treatment of a sealer, such as boiled linseed oil, seals and strengthens the surface fibers of the wood, and a thorough coating of a mold release wax enhances mold separation from the plug. The wax and linseed oil both should be brushed after application in order to remove excess oil and wax that is retained in the recessed wood grain pores. It is also important to apply a thorough coating of mold release wax to the mold when the product is manufactured, for the same reason. Since the grain structure on the wood protrudes from the mold as opposed to being recessed into the mold, surface brushing readily removes excess mold release compound.

Another important feature of the present invention is the manner in which the surface of the product is toned to produce a wood-like appearance. Conventional stains and the like produce a flat, artificial appearance, but viscous pigmented oils, such as artist oils, which are especially preferred, produce genuine wood-like appearance. Artist oils come in a number of mixable colors that can be adapted to produce the exact finish desired, and the paste consistency of the oils permits them to be worked into the pores in the product and wiped over the surface of the product to produce the right tone and grain effects. The oils should have a dryer incorporated in them in order to produce accelerated drying times.

When all of this has been accomplished, the finished product looks exactly like the wood plug from which the product was made. If the mold has been produced carefully and the finishes have been applied correctly, every feature and even every defect in the wood is faithfully reproduced in the synthetic resin product. Even end grain portions of the work reproduce the same exact appearance as the end grain in the model.

Using the process of the present invention produces an almost identical replica of a wood product while still preserving the numerous advantages of a product formed of synthetic resin. The synthetic product is almost impossible to distinguish from the genuine wood counterpart, and product after product having the same exact finish can be formed from the same mold.

DETAILED DESCRIPTION OF PREFERRED EMBODIMENTS

Figure 1:
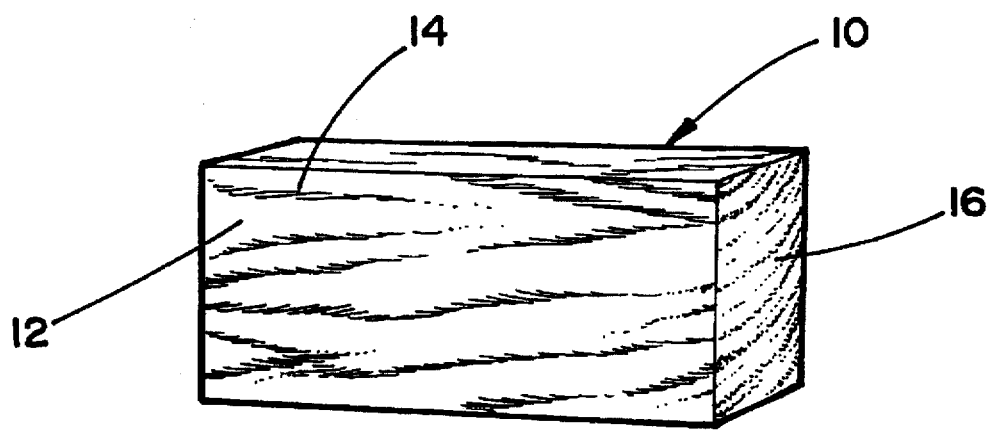
FIG. 1 is a perspective view of a product formed of a synthetic material with a wood appearance produced in accordance with the present invention.

Referring to the drawings, a product 10 formed of a synthetic resin is shown in FIG. 1 with a surface configuration having an appearance of wood. Product 10 desirably is formed of fiberglass reinforced polyester resin or vinylester resin, although other synthetic resins can be used. Product 10 has a front surface 12 that displays a grain pattern 14 that is relatively darker than the other portions of the surface. The product has an end 16 that displays a typical end grain appearance of wood.

Figure 2:
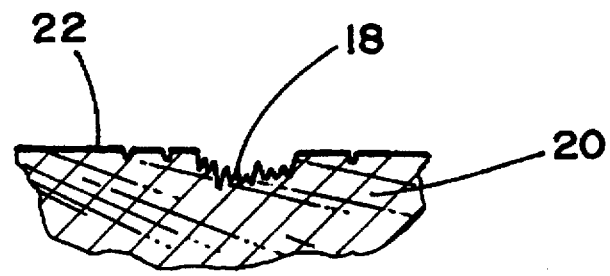
FIG. 2 is a fragmentary sectional view showing the wood grain construction in wood.

Referring to FIG. 2, the grain 18 in a typical piece of wood 20 is illustrated. The grain is a darker tissue in wood and is typically more porous and open than the non-grained surface 22 of the wood. The grain typically is recessed below surface 22. Different woods have different types of grain structures. Woods such as mahogany, walnut, and oak, have a naturally open grain structure, whereas woods like cherry and maple are considered closed grain structures, wherein the grain is not as open and porous as the other woods. The grain portion of the wood typically is darker than the non-grained portion of the wood.

Figure 3:
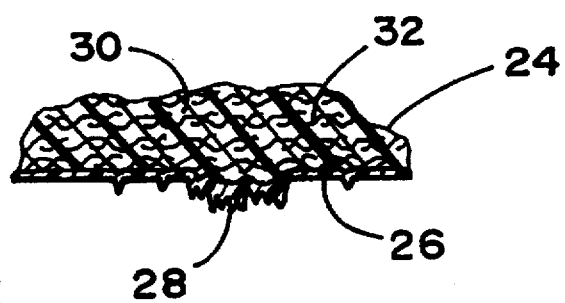
FIG. 3 is a fragmentary sectional view showing a portion of a mold impression of the wood grain configuration of FIG. 2.

FIG. 3 illustrates a fragment of the surface of a mold 24 formed from the wood of FIG. 2. Mold 24 comprises a surface layer 26 formed of tooling gel, which is a particularly high quality polyester gel used for manufacturing tooling for molding fiberglass products. The tooling gel has been applied to this surface of the wood in FIG. 2 and has received an impression 28 of the grain pattern 18 of the wood. The tooling gel is backed by multiple layers of a polyester resin 30 reinforced with fiberglass 32.

Figure 4:
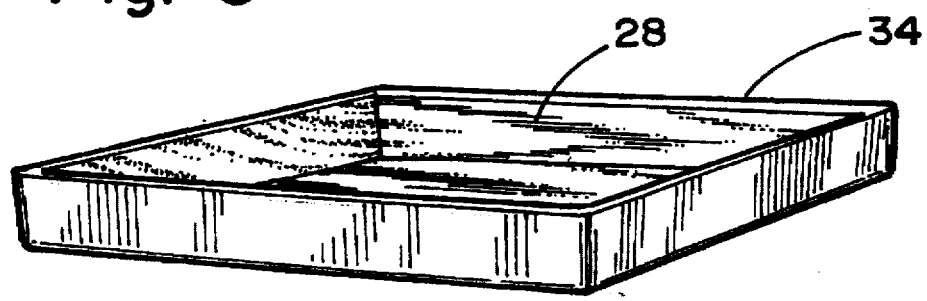
FIG. 4 is a perspective view of a mold formed in accordance with the present invention.

A completed mold 34 incorporating the grain construction 28 described above is shown in FIG. 4. Aside from the grain configuration and the toning and finishing process of the present invention, the products are manufactured by conventional fiberglass molding techniques.

It should be understood that the fiberglass molding techniques are described herein for exemplary purposes and that other conventional molding techniques can be used advantageously in the present invention.

The steps involved in performing the process of the present invention are described below in connection with specific examples of products formed by the process:

EXAMPLE I

A panel is formed of fiberglass reinforced polyester resin with a black walnut finish that simulates real wood by first fabricating a wood plug in the shape of the product to be formed. Desirably the plug is formed of the wood finish desired, namely, black walnut. However, if black walnut is not available, a different wood with a similar grain pattern may be satisfactory.

After the wood plug has been formed, the surface of the wood is sanded to the desired smoothness and is then brushed in the direction of the grain with a nylon or similar bristle brush that is relatively stiff (a scrub brush is satisfactory) in order to abrade the grain tissue of the wood and open the grain pores of the wood. Desirably, the brushing is performed for a period of thirty (30) to sixty (60) minutes with light pressure. The brush should be stiff enough to open the grain pores but should not be so stiff that it scratches the wood. The amount of brushing is determined by the amount of grain definition desired in the finished product. Other techniques for opening the grain of the wood, such as the application of acetone or paint removers, also can be employed. As indicated below, hard woods with close grains may actually require sandblasting to open the grain of the wood.

After the plug has been brushed to the extent desired, the surface of the plug is sealed with a coating of boiled linseed oil. This penetrates and seals the surface of the wood and hardens the surface fibers so that they will not easily break off when a tooling resin is applied to the wood surface. After application of the boiled linseed oil, the product is allowed to cure for a period of times of six (6) to twelve (12) hours. The surface of the plug is then brushed again in order to remove the excess linseed oil from the pores of the wood. Brushing for thirty (30) to sixty (60) minutes is satisfactory. Boiled linseed oil is particularly desirable as a sealer for the plug, because the linseed oil dries relatively slowly. Thus, after the linseed oil penetrates the wood and seals the surface, any excess linseed oil remains soft and can be removed from the grain pores by brushing. A quicker drying sealer might dry completely and fill the grain pores, reducing the depth of the grain impression available with the wood plug.

After the linseed oil has been cured and the excess brushed off the plug, a conventional mold release compound is thoroughly applied to the surface of the plug prior to making a mold from the plug. Because of the intricate and delicate grain pattern in the wood, it is important that the mold release compound be thoroughly and intimately applied to the surface of the wood. In the preferred practice of the present invention, MacGuires No. 8 mold release paste wax is applied to the wood surface with a cloth using a circular motion to wipe the wax thoroughly into all the crevices of the wood. The wax is then rubbed in a direction parallel to the grain of the wood and then the wax is brushed to remove excess wax from the wood. This process is repeated until there are ten (10) coats of wax on the wood.

While a particular wax and number of times of waxing are preferred, other types of mold release waxes, such as liquids, can be used, with the objective being a wood surface that has durable mold release characteristics with no residual wax in the grain pore crevices in the wood.

After the product has been thoroughly waxed with a mold release compound, a mold impression is formed from the plug by first applying a tooling gel to the surface of the wood plug. The tooling gel is a conventional pigmented resin and comes in standard colors of black and orange. These colors show imperfections better than other colors of tooling gel. A tooling gel is preferred over a conventional resin, because it is more desirable and withstands greater heat. The tooling gel is applied with a spray gun to a thickness of about 25–30 mils, which is standard for fiberglass mold manufacturing. The tooling gel is allowed to cure for two (2) to twelve (12) hours.

After the tooling gel cures, the mold is completed using conventional fiberglass molding techniques. Fiberglass mats impregnated with tooling resin are applied to the outer surface of the tooling gel until the mold has a desired thickness, generally of ¼ to ¾ inches, depending upon the size of the part. The mold is allowed to cure for about twenty-four (24) hours after this point in order to allow the resin to fully cure and to eliminate vapors present in the resin.

The next step is to remove the mold from the wood plug and trim the edges of the mold to the size desired. If warpage is possible in the part, the mold is reinforced with wood or metal in a conventional manner.

Aside from the extra steps due to the intricate and delicate nature of the wood grain pattern in the wood plug, the details of manufacture of the mold are conventional fiberglass manufacturing techniques.

To use the mold for manufacturing products, it is important that the mold first be treated thoroughly with a mold release compound. Again, it is preferred to wax the mold several times with MacGuires No. 8 mold release wax. Ten (10) coats are desired on the first application of the wax. The wax should be brushed between coats, although brushing is not quite as important for the mold, because the grain impression extends outwardly from the mold and is not a depression in the mold. The brushing eliminates wax build up.

To insure adequate product release, it is desired to re-wax the mold at least to some extent for each part produced. One coat of wax is satisfactory.

After the mold has been waxed, the product is produced in a conventional manner. A gel coat is sprayed to a thickness of about 15 mils in the mold, with the gel coat being impregnated with a base coat color that is desired. The base coat color is significant. Typically, a beige or light tan color is used, and this color is typically somewhat lighter than the simulated wood color that is to be produced on the product. When black walnut and mahogany are produced, the base coat color is desirably a beige color. When oak, cherry, or maple products are produced, a light tan base coat color is used.

After the gel coat with the base coat color is applied and cured for one (1) to four (4) hours (or as is conventional in the industry), fiberglass mats impregnated with resin are laminated to the exterior of the gel coat in a conventional manner and cured until dry.

The mold is then removed from the product and the product is trimmed and the edges sanded. At this point, the product contains an accurate impression of the wood plug and its open grain structure.

The next step is to apply a finish to the product that gives the product a realistic wood appearance. In order to accomplish this, a pigmented viscous paste admixed with the proper color pigments is dabbed on the surface of the product with a rag or the like and is rubbed in a circular pattern in order to work the paste into the simulated pore structure of the product. Conventional stains have been found to be unsatisfactory. However, a highly desirable product is a product known as an artist oil, which is the type of oil that is used for making oil paintings. Artist oils are viscous pigmented oils and come in a variety of colors that can be mixed together to produce any particular shade desired. After the artist oils are applied to the surface of the product and worked into the pores, the oils are wiped from the surface in the direction of the grain until the surface has the desired hue or shade. The extra oil worked into the simulated grain pores in the product gives the grain pores a darker color than the rest of the product and simulates to a remarkable extent the actual appearance of wood.

The artist oils or pigmented paste employed in the present invention provides the toner color to the product.

It is an important feature of the present invention that the artist oil be modified by the addition of a dryer compound, such as Japan dryer. The artist oils may take days to dry without a dryer, but this drying time can be reduced to as little as two (2) hours with an appropriate dryer mixture.

After the artist oils have cured, a protective coating is applied to the surface of the product in a conventional manner. This coating may be a clear coat of lacquer or urethane sprayed on the surface of the product. The finished coat can have a satin or gloss finish or, if it has a gloss finish, the gloss finish can be dulled by a light application of steel wool after the finish is cured.

Upon the completion of the finish coat, the product has a durable, wood-like finish that is virtually indistinguishable from genuine wood.

EXAMPLE II

To produce a wood product having a cherry or maple finish, the foregoing procedure can be modified somewhat. Because of the hardness of the wood and the closed grain structure of the wood, it may be necessary to actually sandblast the wood in order to open up the grain pores. A somewhat lighter tan base coat is employed in the gel coat layer of the product and a mixture of artist oils designed to simulate cherry or maple is used. The appropriate mixture can be selected by personal preference and experience.

It should be understood that the foregoing are merely exemplary embodiments of the present invention and that various changes in the steps and formulations used in the process may be made without departing from the spirit and scope of the present invention, as defined in the appended claims.

We claim:

1. A process for producing a synthetic resin product having a real wood appearance, with a desired grain pattern and a desired color, comprising the steps of:

forming a model or plug of the product from real wood having the desired grain pattern;

treating the wood to the extent necessary to remove any finish and open the wood grain;

producing a generally rigid non-compression mold from the plug from a moldable fiberglass resin after treating the plug to promote separation of the mold from the plug, the mold being formed by first applying a gel coat on the plug and then applying resin impregnated fiberglass matting to an outer surface of the gel coat;

molding the product with the mold, using non-compression molding, from a moldable synthetic fiberglass resin after treating the mold to promote product release, such that the molded product has simulated wood grain pores corresponding to the open grain pores in the wood plug, the product being molded by first applying a pigmented tan or beige gel coat to the mold so as to produce a surface layer having a base pigment color no darker than the desired wood color;

wiping a viscous pigmented artist oil toner paste with a drier incorporated therein on the surface of the product, the toner paste being of a color darker than the base pigment color, such that when the paste is applied to and partially wiped off the surface of the product the desired color is produced on the surface and in the simulated wood grain pores of the products; and applying a substantially transparent protective finish over the surface of the product.

2. A process according to claim 1, wherein the surface of the wood is treated by brushing it with a bristle brush to open the grain pores of the wood.

3. A process according to claim 1, wherein the surface of the wood is treated by sandblasting to open the grain pores of the wood.

4. A process according to claim 1, wherein the surface of the wood is treated chemically to open the grain pores of the wood.

5. A process according to claim 1, wherein the wood plug is treated with sealer prior to the use of the plug for making a mold, the sealer leaving the grain pores of the wood open after the sealing is completed.

6. A process according to claim 1, wherein the sealer is boiled linseed oil, any excess residue of the boiled linseed oil being brushed off the surface of the wood and the open grain pores after the boiled linseed oil has at least partially cured.

7. A process according to claim 1, wherein the wood plug is coated with a mold release compound prior to making the mold, and excess compound is removed by brushing from the open grain pores in the wood prior to making a mold impression from the plug.

8. A process according to claim 7, wherein the mold is coated with mold release compound before molding products, and excess compound is brushed off the mold before molding the products.

9. A process according to claim 1, wherein the toner paste comprises artist oils.

10. A process according to claim 1, wherein the clear comprises a sprayed lacquer or urethane finish.

11. A process for producing a product from a synthetic resin with a wood appearance comprising:

preparing a wooden plug of the product with a surface having a desired wood grain pattern;

brushing the surface of the plug with a non-wire brush in a direction parallel to the wood grain pattern for a sufficient period of time to open grain pores of the wood in the surface, the brushing being sufficiently light to avoid scratching the wood;

applying a sealer to the wood plug that seals the surface and strengthens wood fibers in the surface, the sealer being such that excess sealer applied to the wood can be removed by brushing the wood surface;

brushing the wood surface to remove excess sealer;

applying a mold release compound to the wood plug that permits synthetic resin mold material applied to the wood plug to be released therefrom;

brushing excess mold release compound from the wood plug surface and the grain pores therein;

producing a generally rigid non-compression from the plug from a moldable fiberglass resin by applying to the surface of the wood plug a resin mold material suitable for making molds for synthetic resin products in order to produce a female mold cavity that can be used for molding products simulating the wood plug, the application of the mold material comprising first applying a gel coat to the mold and then applying a resin impregnated fiberglass matting to an outer surface of the gel coat;

applying a mold release compound to the surface of the mold after it has been produced and cured and removing any excess compound from the mold surface;

molding a product in the mold from a moldable fiberglass resin material using non-compression molding techniques, and then carefully removing the product from the mold after it has cured, the product being formed by first applying to the mold a pigmented exterior base coat of resin material that is no darker than a simulated wood color desired;

applying a toner coat to the molded product that simulates the wood color desired, the toner coat comprising one or more pigments suspended in a viscous paste material that is compatible with the molded product and with any surface finish to be applied to the product, the paste material being sufficiently viscous to permit the pigment to be worked into the grain of the wood pattern without dripping from the product;

wiping the toner coat at least partially off of the product, leaving a sufficient amount of pigment on the product to give the product a desired color while at least partially filling the deeper wood grain impressions in the product and thereby toning them with a darker wood grain color; and applying a substantially clear finish coat to the exterior of the product.

* * * * *